A. B. BROWNE.

CARBURETER.

APPLICATION FILED APR. 15, 1914.

Reissued Aug. 4, 1914. 13,784.

Witnesses
M. P. Nichols
C. L. Weed

Inventor
Arthur Benjamin Browne
by Seymour Earle
Atty

UNITED STATES PATENT OFFICE.

ARTHUR B. BROWNE, OF BRANFORD, CONNECTICUT.

CARBURETER.

13,784. Specification of Reissued Letters Patent. Reissued Aug. 4, 1914.

Original No. 1,067,502, dated July 15, 1913, Serial No. 658,008. Application for reissue filed April 15, 1914. Serial No. 832,002.

*To all whom it may concern:*

Be it known that I, ARTHUR BENJAMIN BROWNE, a citizen of the United States, residing at Branford, in the county of New Haven and State of Connecticut, have invented a new and useful Improvement in Carbureters; and I do hereby declare the following, when taken in connection with the accompanying drawings and the characters of reference marked thereon, to be a full, clear, and exact description of the same, and which said drawings constitute part of this application, and represent, in—

Figure 3:
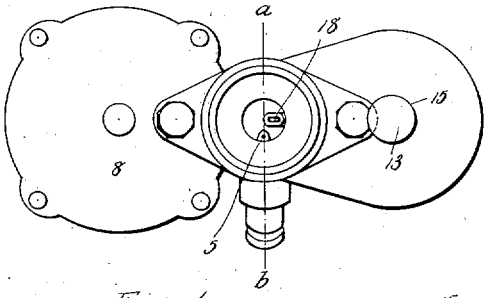
Figure 4:
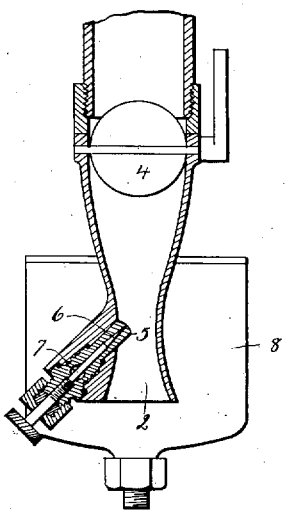
Figure 1:
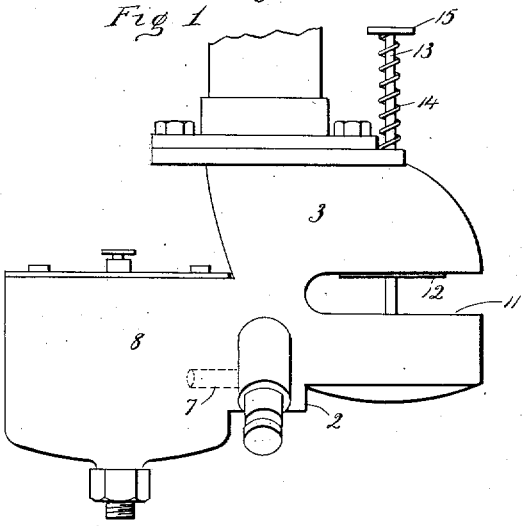
Figure 5:
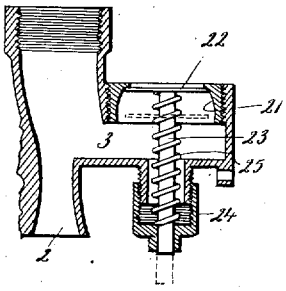
Figure 2:
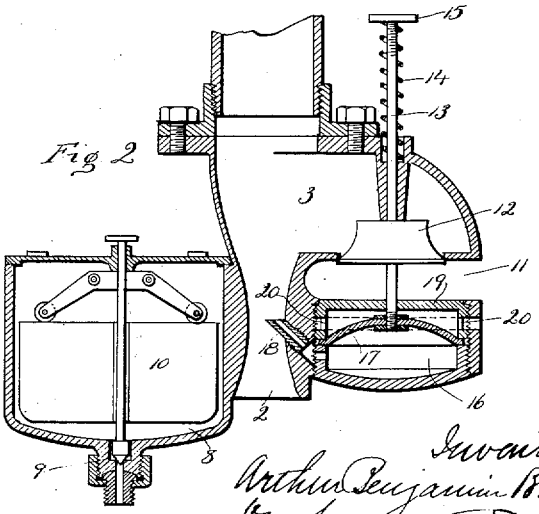

Figure 1 a side view of a carbureter constructed in accordance with my invention. Fig. 2 a longitudinal sectional view of the same. Fig. 3 a top or plan view. Fig. 4 a sectional view on the line *a—b* of Fig. 3. Fig. 5 a sectional view illustrating a modified form of carbureter embodying my invention.

My invention relates to an improvement in carbureters for supplying internal combustion engines with a combustible mixture of vapor-gas and air; and the object is to provide means whereby a closer regulation of the relative proportions of gas and air may be maintained, irrespective of varying engine speeds, than is at present possible.

My invention more especially applies to that form of carbureter wherein a mixing chamber is supplied with air through two openings or passages, one of which, usually termed the primary inlet passage, is of permanent area; and the other, usually termed the auxiliary inlet, is of variable area. In this form of carbureter it is customary to vary the area of the auxiliary opening by means of a valve, or other closure, which is actuated by the partial vacuum created within the mixing chamber by the suction of the engine. In carbureters of this construction it is found that the auxiliary valve opens too far, admitting too much air at high engine speeds. In my device I so form and so control the auxiliary area that, irrespective of the amount of travel or movement to which the closure is subjected, the exposed auxiliary area is at all times that necessary for the admittance of the proper amount of air to make a substantially quantitative mixture.

In carrying out my invention, I make use of the fact that owing to various modifying coefficients, differing velocities of the air within the primary inlet passage, occasion greater differences of pressure within said primary inlet which bear a more definite relation to the flow of fuel than do the differing degrees of vacuum formed within the mixing chamber, so that by directly utilizing the reduction of pressure caused by this velocity within said primary inlet, for the modification of the area of the auxiliary inlet, the total area of air admission is so modified that the velocity of the air passing the fuel jet is, at all times, that necessary to induce a flow of fuel definitely proportional to the total quantity of air admitted. By this means I secure closer and more positive regulation of the mixture than is otherwise possible.

The accompanying drawings show carbureters of convenient design embodying the principles of my invention, although material changes may be made in the form and arrangement of the different parts, and I do not confine myself to the specific form shown.

In Figs. 1 to 4 inclusive of the drawings, I show a primary air inlet in the form of a Venturi tube 2, and a mixing chamber 3 the opening of which is controlled by a throttle 4 which may be of any approved construction. In the Venturi tube 2 is inserted a fuel jet 5, said jet being controlled by a manually operated needle valve 6. Liquid fuel, such as gasolene, passes to this needle valve through a tube 7 from a reservoir 8 which may also be of any approved form. As herein shown, this reservoir is adapted to have gasolene enter through a valve 9 which is controlled by a float 10, through any ordinary form of linkage. In the casing forming this mixing chamber 3 is an auxiliary opening 11 to the atmosphere. The area of this opening is controlled by a valve 12 which is mounted on a stem 13 and normally held in a position closing the opening 11 by the spiral spring 14, the tension of which may be adjusted by a thumb nut 15. The lower end of the stem 13 extends into a vacuum chamber 16 and is attached to a flexible diaphragm 17 of any suitable material. The diaphragm 17 is secured near its outer edges and forms the upper wall of the vacuum chamber 16. Leading from this vacuum chamber is a nozzle 18 extending into the Venturi tube preferably in approximate line with the end of the jet 5. To prevent a decrease of pressure on the top of the diaphragm by the velocity of the air passing into the opening 11, the stem 13 is passed through a plate 19 below which openings 20 communicate with the atmosphere.

During the suction stroke of the motor which the apparatus is supplying, the velocity of the air passing through the Venturi tube 2 causes a certain reduction of pressure within said tube, resulting in a flow of liquid through the jet 5, and, at the same time, occasioning a corresponding diminution of pressure within the vacuum chamber 16, when the atmospheric pressure upon the diaphragm 17 causes the valve 12 to open an amount determined by the unit deflection of the spring 14, thereby admitting a certain amount of air to the mixing chamber 3. As the speed of the motor increases, the increased velocity of air through the Venturi causes a proportional increase of pressure on the diaphragm 17, which, in turn, causes a proportional deflection of the spring 14 permitting the valve 12 to open a proportional amount of its travel. The valve 12 is so formed that the annular area between it and the opening 11 is enlarged, as the valve is depressed by the diaphragm, a sufficient amount to provide, when the valve is in any position, an inlet area which, together with the area of the Venturi 2 at the point of the fuel jet 5, shall cause the velocity of the air passing the fuel jet 5 to be such as shall inspirate an amount of liquid fuel directly proportional to the quantity of air entering the mixing chamber 3. To make the accomplishment of this result practical, the valve 12 should preferably move to a certain definite position of opening for any given engine speed and this may be best accomplished by the arrangement of parts shown in Fig. 2, in which construction the travel of the valve is directly modified by the velocity with which the incoming air passes the nozzle 18, and said travel is less modified by frictional resistance, changes of density, variations in temperature and other modifying influences which occur between the point of admixture of air and fuel and the mixing chamber 3, to which it would be subject if said travel were caused solely by the vacuum in the mixing chamber 3, as is the usual practice. If the tension and deflection of the spring 14 is properly adjusted with relation to the form of the valve 12, as the speed increases the valve 12 will be opened to a greater degree; but to whatever point it is opened, as before stated, the velocity of the air over the fuel jet in the main inlet passage will be such that at all times a corresponding amount of fuel is inspirated.

Instead of forming the valve with a curved surface, the valve-seat may be curved as shown in Fig. 5. In this form of my invention the opening into the mixing chamber 3 has a curved seat 21 while the valve 22 is a flat disk of uniform diameter and is mounted at the end of a spindle 23 guided by a nut 24 between which and the disk is a spring 25 tending to force the valve to its closed position. This construction illustrates one alternative method of varying the area of the auxiliary air inlet in accordance with the principles of my invention, but for the reasons hereinbefore set forth, I prefer to control the movement of the valve by the method shown in Fig. 2.

I claim:—

1. A carbureter having a chamber provided with a primary air inlet and an auxiliary air inlet of variable area, a fuel duct having a normally fixed orifice opening into said inlet for admitting fuel into said chamber and means responsive to the reduction of pressure created within the primary air inlet by the velocity of the air by its passage through said primary air inlet for varying the area of the auxiliary air inlet thereby inducing a flow of fuel through said fuel duct in proportion to the quantity of air admitted.

2. A carbureter having a mixing chamber provided with a primary air inlet and an auxiliary air inlet of variable area, a fuel duct having a normally fixed orifice opening into said primary air inlet, a vacuum chamber having no communication with said mixing chamber except through the said primary air inlet, in which said vacuum chamber a reduction of pressure caused by the velocity of the air within the said primary air inlet, is made to modify the area of the auxiliary air inlet thereby inducing a flow of fuel through said fuel duct in proportion to the quantity of air admitted.

3. A carbureter having a mixing chamber provided with a primary air inlet and an auxiliary air inlet of variable area, a fuel duct having a normally fixed orifice opening into said primary air inlet, a vacuum chamber having no communication with said mixing chamber except through the primary air inlet, a diaphragm controlled by variations of pressure in the said vacuum chamber and operating to vary the area of the auxiliary air inlet thereby inducing a flow of fuel through said fuel duct in proportion to the quantity of air admitted.

ARTHUR B. BROWNE.

Witnesses:

FREDERIC C. EARLE,
M. P. NICHOLS.